(12) United States Patent
Naito (10) Patent No.: US 10,002,210 B2
(45) Date of Patent: Jun. 19, 2018

(54) SIMULATION MODEL GENERATION METHOD FOR FILLER MIXED MATERIAL

(71) Applicant: SUMITOMO RUBBER INDUSTRIES, LTD., Kobe-shi, Hyogo (JP)

(72) Inventor: Masato Naito, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 1008 days.

(21) Appl. No.: 14/350,319

(22) PCT Filed: Oct. 11, 2012

(86) PCT No.: PCT/JP2012/076263
§ 371 (c)(1),
(2) Date: Apr. 7, 2014

(87) PCT Pub. No.: WO2013/058155
PCT Pub. Date: Apr. 25, 2013

(65) Prior Publication Data
US 2014/0257783 A1   Sep. 11, 2014

(30) Foreign Application Priority Data

Oct. 20, 2011 (JP) .................................. 2011-230956

(51) Int. Cl.
| | |
|---|---|
| G06F 7/60 | (2006.01) |
| G06F 17/10 | (2006.01) |
| G06F 17/50 | (2006.01) |

(52) U.S. Cl.
CPC ...... *G06F 17/5009* (2013.01); *G06F 17/5018* (2013.01); *G06F 2217/16* (2013.01)

(58) Field of Classification Search
None
See application file for complete search history.

(56) References Cited

U.S. PATENT DOCUMENTS

2006/0106586 A1* 5/2006 Naito .................. G06F 17/5018
703/2

FOREIGN PATENT DOCUMENTS

| EP | 1 657 657 A2 | 5/2006 |
|---|---|---|
| JP | 2005-121535 A | 5/2005 |

(Continued)

OTHER PUBLICATIONS

International Search Report, dated Dec. 25, 2012, issued in PCT/JP2012/076263.

(Continued)

*Primary Examiner* — Cedric Johnson
(74) *Attorney, Agent, or Firm* — Birch, Stewart, Kolasch & Birch, LLP (57) ABSTRACT

A method for producing a simulation model of a filler compound in which a filler is dispersed and mixed in a matrix includes partitioning a simulation-model forming space, using a computer, into a filler region and a non-filler region so as to determine a boundary between these regions, dividing the filler region into a finite number of elements so as to set a filler model, dividing the non-filler region into a finite number of elements, setting, as an interface model, at least one element among the finite number of elements of the non-filler region, the at least one element being at least in contact with the filler model, and after setting the interface model, setting, as a matrix model, at least one element among the finite number of elements of the non-filler region, the at least one element being outside the interface model.

4 Claims, 6 Drawing Sheets

(56) References Cited

FOREIGN PATENT DOCUMENTS

| | | | |
|---|---|---|---|
| JP | 2006193560 A | * | 7/2006 |
| JP | 2007-101499 A | | 4/2007 |
| JP | 2008-122154 A | | 5/2008 |
| JP | 4695399 B2 | | 6/2011 |

OTHER PUBLICATIONS

Extended European Search Report, dated May 4, 2015, for European Application No. 12840968.7.

* cited by examiner

SIMULATION MODEL GENERATION METHOD FOR FILLER MIXED MATERIAL

This application is the National Phase of PCT International Application No. PCT/JP2012/076263, filed on Oct. 11, 2012, which claims priority under 35 U.S.C. 119(a) to Patent Application No. 2011-230956, filed in Japan on Oct. 20, 2011, all of which are hereby expressly incorporated by reference into the present application.

The present invention relates to a method for producing a simulation model of a filler compound readily and in a short time using a computer. The filler compound includes a filler dispersed and mixed in a matrix.

BACKGROUND ART

Recently, analysis by computer simulation has been conducted to evaluate, for example, deformation behaviors, stresses, and strain distribution states of a filler compound (for example, carbon reinforced rubber) in which a filler (for example, carbon black) is dispersed and mixed in a matrix (for example, rubber). In order to conduct the computer simulation, it is required to prepare a simulation model of the above filler compound that can be used in a numerical analysis method such as the finite element method.

Figure 8:
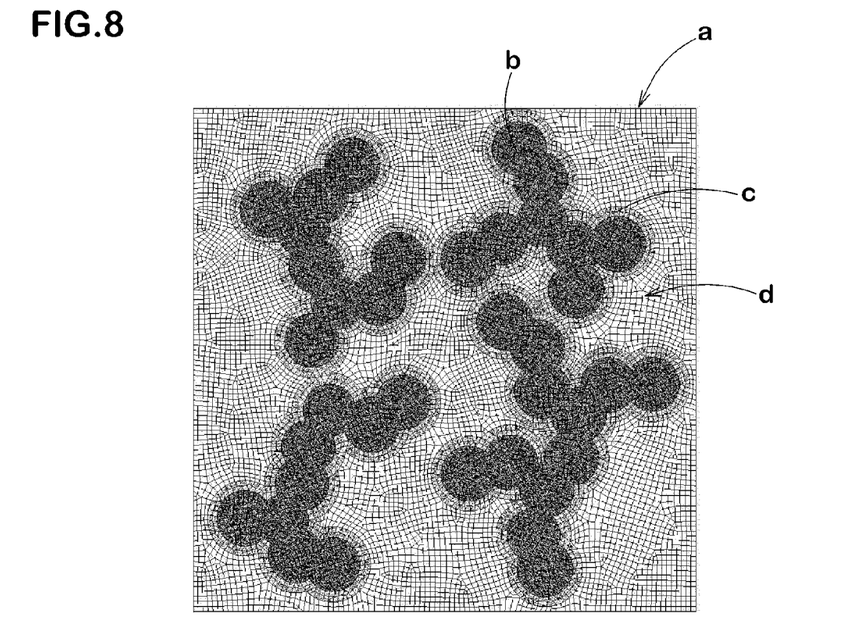
FIG. 8 is a diagram illustrating a conventional simulation model.

An example of such a simulation model, "a", is visualized in FIG. 8. The simulation model "a" typically includes filler models "b" representing the filler, interface models "c" having a small thickness and arranged outside the filler models "b", and matrix models "d" arranged outside the interface models "c" and representing the matrix.

In an actual material, physical layers such as the interface models "c" may not be identified distinctly. However, it has been known that portions of the matrix that are in contact with the filler show different values of physical properties as compared with other different portions of the matrix. Based on this knowledge, the interface models "c" are often employed.

The applicant of the present invention has already suggested Patent document 1, specified below, as a method for producing a simulation model "a" using a computer. Patent document 1 includes the following steps s1 to s6 to automatically produce the simulation model "a".

s1) A step of obtaining an image containing a matrix and a filler from a filler compound.

s2) A step of extracting the edges of the filler from the image.

s3) A step of setting the outlines offset for a predetermined thickness outside the edges after extracting the edges.

s4) A step of dividing an inside area of the edges into elements and defining an aggregate of the elements as a filler model.

s5) A step of dividing an outside area of the outlines into elements and defining an aggregate of the elements as a matrix model.

s6) A step of dividing an area between the outlines and the edges into elements and defining an aggregate of the elements as an interface model having values of physical properties different from values of physical properties of the matrix model.

RELATED ART DOCUMENTS

Patent Documents

Patent document 1: Japanese Patent No. 4695399.

DISCLOSURE OF THE INVENTION

Problems to be Solved by the Invention

Figure 9:
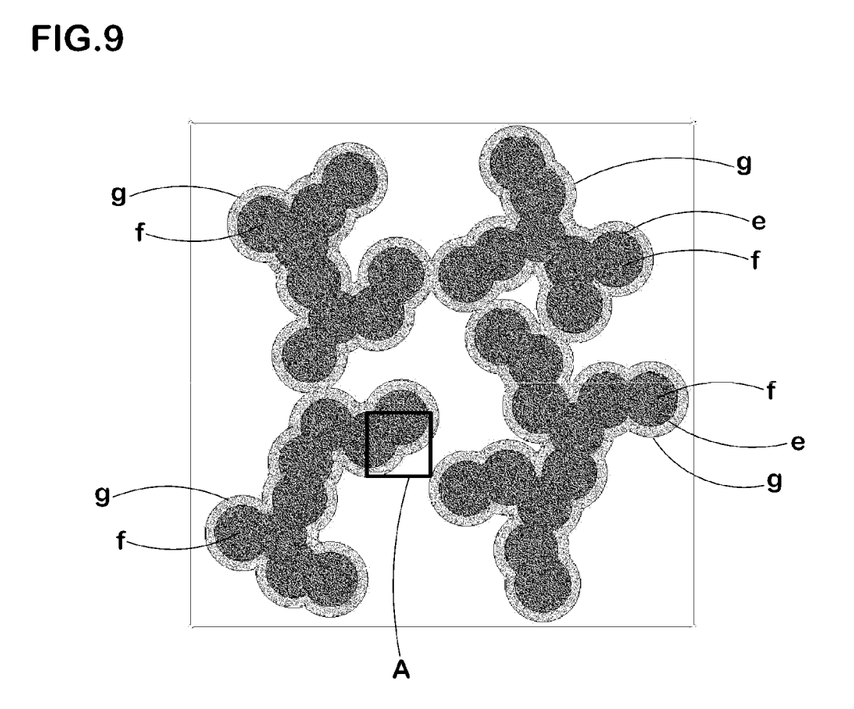
FIG. 9 is a diagram illustrating edges and offset outlines of a filler.
Figure 10:
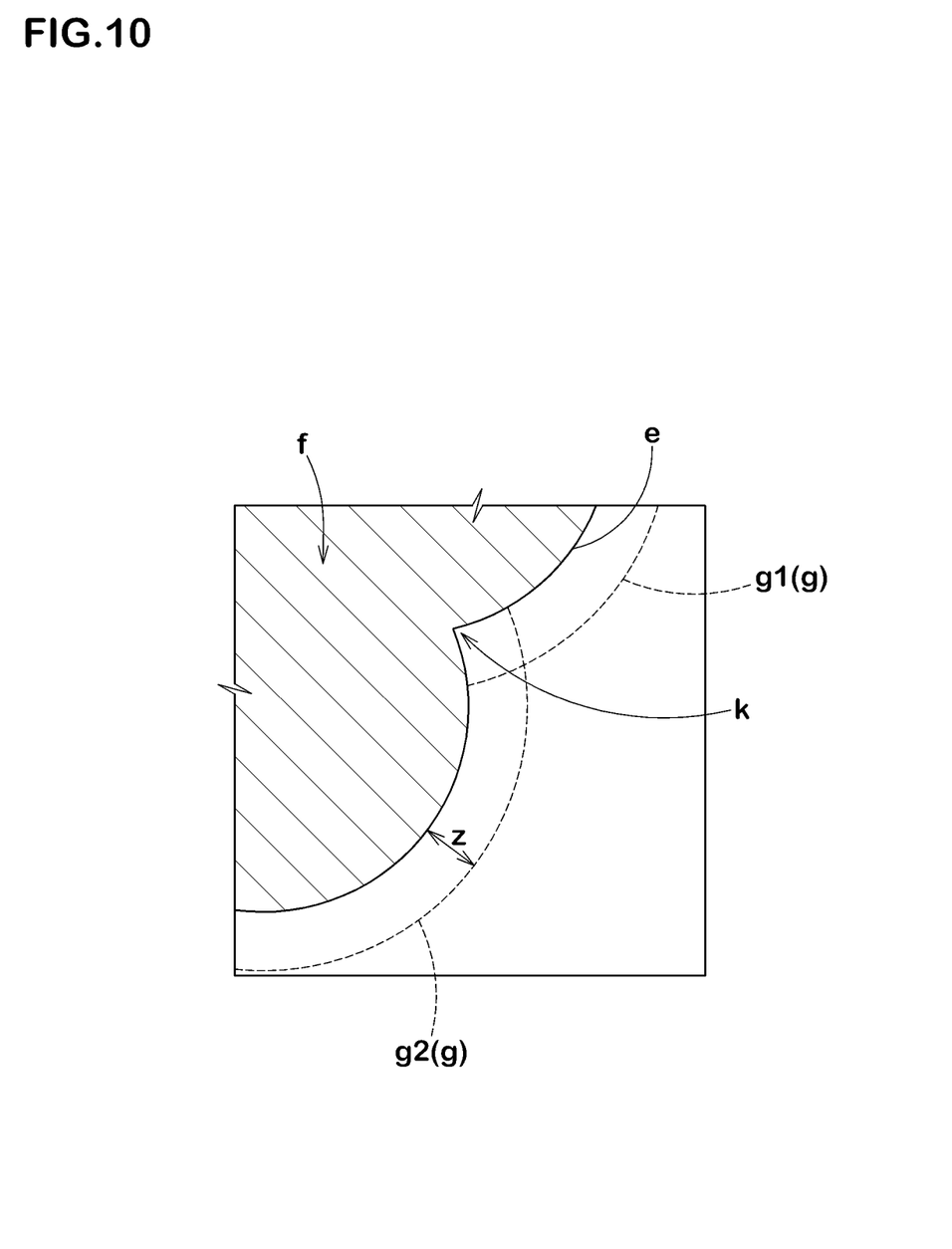
FIG. 10 is an enlarged view of a part A of FIG. 9.

Unfortunately, the above method involves the following problems. The outline shape of the filler is not only a single particle having a simple spherical shape, but also, as shown in FIG. 8, a plurality of connected particles having a complicated shape of a bunch of grapes. Consequently, concerning the filler "f" having the complicated shape, for example, as shown in FIG. 9, which illustrates the state after the step s3, and FIG. 10, which is an enlarged view of the part A of FIG. 9, when the outlines g1 and g2 are set to be offset outside the edge "e" of the filler "f" for a predetermined thickness z, there are cases in which the outlines g1 and g2 intersect each other in a re-entrant part k of the edge "e" in particular. Such a phenomenon makes it difficult to perform steps s4 and s6 using the computer, such that the processing may be interrupted. In this case, it is required to manually correct the outlines g1 and g2 of the interface model. Thus, unfortunately, operations for producing the simulation model require a long time.

The present invention has been made in view of the above problems. It is a main object of the present invention to provide a method for producing a simulation model of a filler compound readily and in a short time. The method basically includes: determining a boundary to partition a simulation-model forming space into a filler region and a non-filler region; dividing the filler region into a finite number of elements so as to set a filler model; dividing the non-filler region into a finite number of elements; setting, as an interface model, elements at least in contact with the filler model among the elements of the non-filler region; and setting, as a matrix element, elements outside the interface model among the elements of the non-filler region.

Means for Solving the Problem

The present invention provides for a method for producing, using a computer, a simulation model of a filler compound in which a filler is dispersed and mixed in a matrix, the method comprising: partitioning an simulation-model forming space into a filler region and a non-filler region so as to determine a boundary between these regions; dividing the filler region into a finite number of elements so as to set a filler model; dividing the non-filler region into a finite number of elements; setting, as an interface model, at least one element among the elements of the non-filler region, the at least one element being at least in contact with the filler model; and setting, as a matrix model, at least one element among the elements of the non-filler region, the at least one element being outside the interface model.

Preferably, the step of setting the interface model may comprise setting, as the interface model, the elements in contact with the filler model and elements in contact with an outside of the elements in contact with the filler model.

Preferably, physical property different from a physical property of the matrix model may be defined for the interface model.

Effects of the Invention

The method for producing the simulation model of the filler compound includes partitioning an simulation-model forming space into a filler region and a non-filler region so as to determine a boundary between these regions, dividing the filler region into a finite number of elements so as to set a filler model, dividing the non-filler region into a finite number of elements, setting, as an interface model, at least one element among the elements of the non-filler region, the at least one element being at least in contact with the filler model, and setting, as a matrix model, at least one element among the elements of the non-filler region, the at least one element being outside the interface model. Consequently, in setting the interface model, all that is done using the computer is to simply extract only the elements in contact with the filler model among the elements of the non-filler region. This facilitates the setting of the interface model. Note that the thickness of the interface model can be set as desired.

MODES FOR CARRYING OUT THE INVENTION

An embodiment of the present invention will now be described with reference to the drawings.

In this embodiment, carbon reinforced rubber in which carbon is dispersed and mixed in rubber is suggested as a filler compound, and a procedure for producing a two-dimensional (single-plane) simulation model of the carbon reinforced rubber is described. This procedure is conducted using a computer device, not shown.

Figure 1:
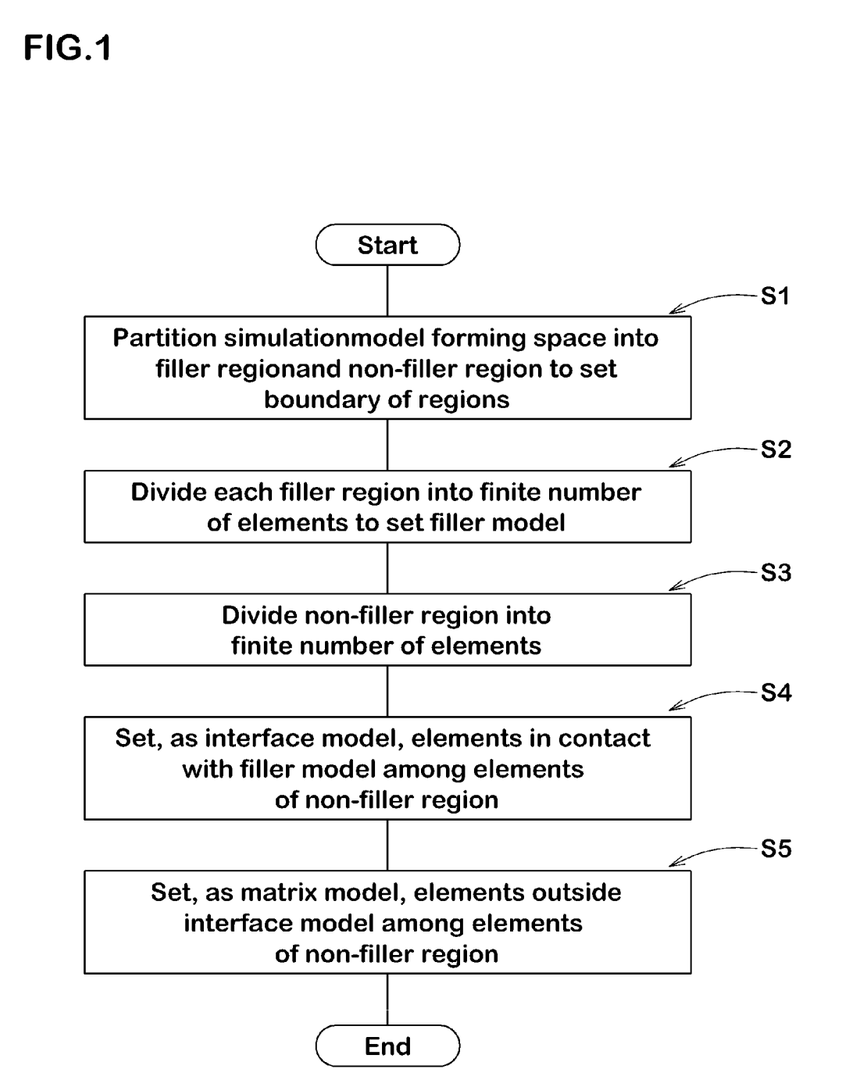
FIG. 1 is a flowchart illustrating an embodiment of the present invention.

FIG. 1 shows an example of the processing procedure of a method for producing the simulation model according to the embodiment of the present invention. In the producing method according to this embodiment, a simulation-model forming space is first partitioned into a filler region and a non-filler region, and a boundary of these regions are set (step S1).

Figure 2:
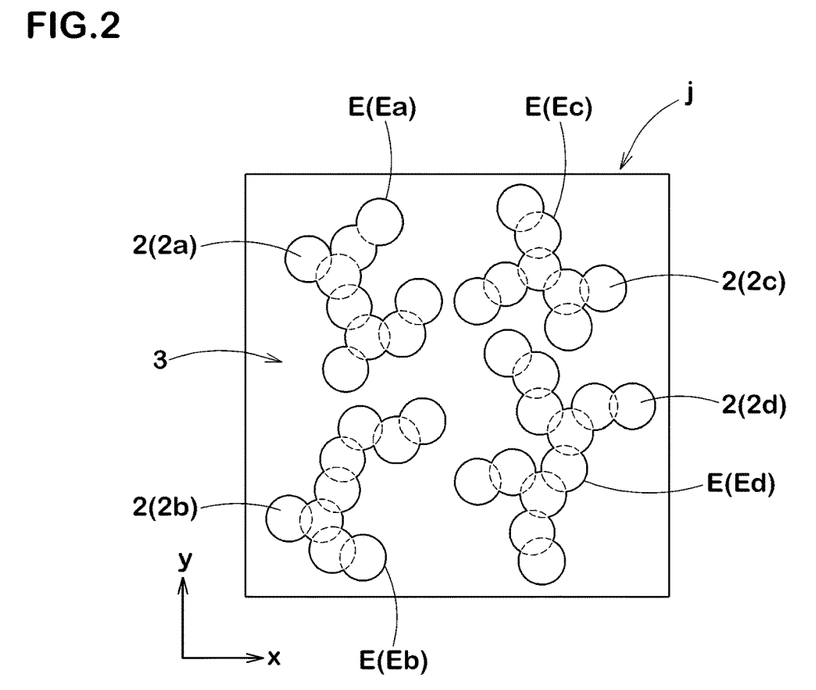
FIG. 2 is an example of an image in which boundaries to partition a simulation-model forming space into filler regions and a non-filler region are extracted.

FIG. 2 shows a rectangular two-dimensional space "j", which has a predetermined size as the simulation-model forming space. In this embodiment, the two-dimensional space "j" constitutes a microstructure (also referred to as a unit cell) as a minimum unit of the simulation model. This two-dimensional space "j" is partitioned into a plurality of filler regions 2 and a non-filler region 3. Thus, boundaries E are set to partition these regions 2 and 3.

In this embodiment, four regions 2a to 2d separate from each other are defined for the filler regions 2. These four filler regions 2a to 2d are surrounded by the boundaries (borderlines) Ea to Ed of connected arcs. Thus, any of the four filler regions 2a to 2d is a closed space.

The non-filler region 3 is specified as an outside area of the boundaries Ea to Ed in the two-dimensional space "j".

Such boundaries Ea to Ed may be obtained using any method. Preferably, a microscopic image of an actual filler compound is subjected to conventionally known image processing, so as to obtain the boundaries Ea to Ed. For example, a microscopic image containing matrix rubber and carbon is obtained using, for example, a TEM, and this image is processed into raster data (note that this processing is unnecessary when digital data can be directly obtained). As necessary, noise is removed. This rasterized image can be subjected to processing to extract the edges of the filler. These extracted edges correspond to the boundaries Ea to Ed. It should be noted that unless the edges (the boundaries) are continuous, discontinuous portions of the edges are preferably subjected to processing such as interpolation processing to make the discontinuous portions continuous.

Figure 3:
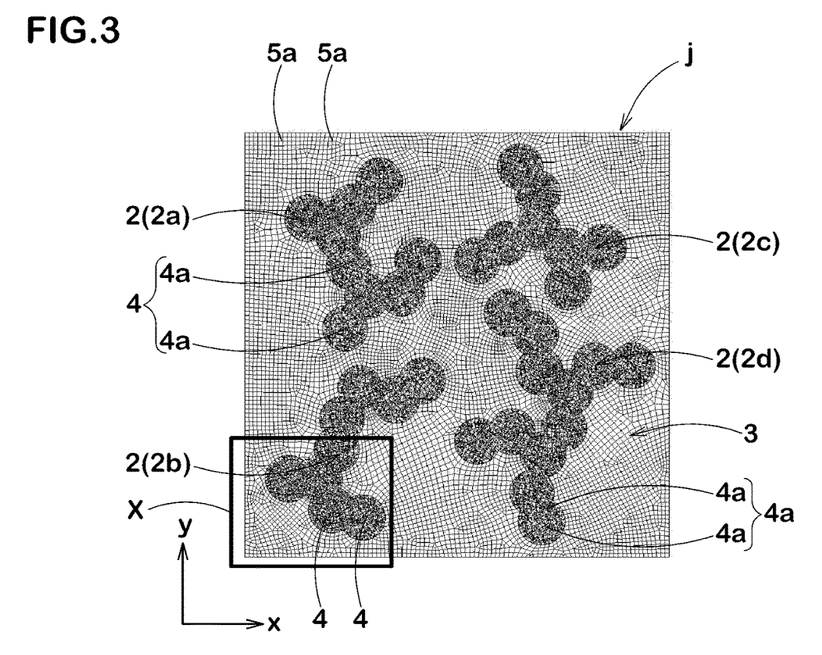
FIG. 3 is a diagram illustrating the state in which each of the space of FIG. 2 is divided into a finite number of elements.

Next, in this embodiment, as shown in FIG. 3, each of the filler regions 2a to 2d is divided into a finite number of elements 4a so as to set a filler model 4. Also, the non-filler region 3 is divided into a finite number of elements 5a (steps S2 and S3). Either of these steps may be performed first.

The filler regions 2a to 2d, each of which is a closed space, and the non-filler region 3 are respectively divided into the finite numbers of small elements 4a and 5a (that is, mesh processing) using various types of application software. The shape of the elements 4a and 5a is preferably a triangle or a rectangle in the case of plane elements. Also, concerning the size of the elements 4a and 5a, a preferable range is determined in advance in accordance with, for example, an object of analysis, so that the processing can be performed in accordance with the preferable range. Information such as node coordinates, element numbers, elements shapes of all the elements 4a and 5a after divided is stored in the computer device.

Further, "setting the filler model 4" means adding information by which the elements 4a corresponding to the filler model 4 among the elements stored in the computer can be discriminated as the elements constituting the filler model 4, so that the elements 4a can be discriminated from other elements.

Figure 4:
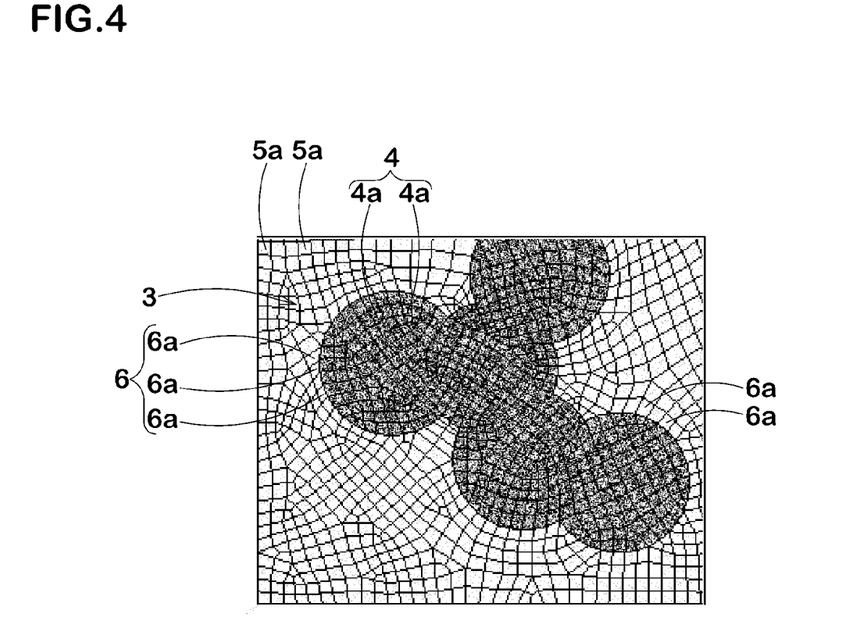
FIG. 4 is a partial enlarged view illustrating a step of setting, as an interface model, elements in contact with a filler model.

Next, as shown in FIG. 4, in this embodiment, processing is performed to set, as an interface model 6, elements 6a in contact with the filler model 4 among the elements 5a of the non-filler region 3 (step S4). The node coordinates of all the elements are stored in the computer, and also, among all the elements, the elements constituting the filler model 4 can be discriminated. Therefore, based on the information, the computer is able to quickly extract the elements in contact with the filler model 4 and to set these elements as the interface model 6.

"The elements 6a in contact with the filler model 4" are the elements that have sides and nodes in common with the elements 4a constituting the filler model 4. Further, in this embodiment, since the filler model 4 has the continuous edges (the outline) surrounding the closed space, the elements 4a in contact with the edges, that is, the interface model, is annularly continuous.

Moreover, "setting as the interface model 6" means adding information by which the elements corresponding to the interface model 6 among the elements stored in the computer can be discriminated as the elements constituting the interface model 6, so that the elements corresponding to the interface model 6 can be discriminated from other elements.

Figure 5:
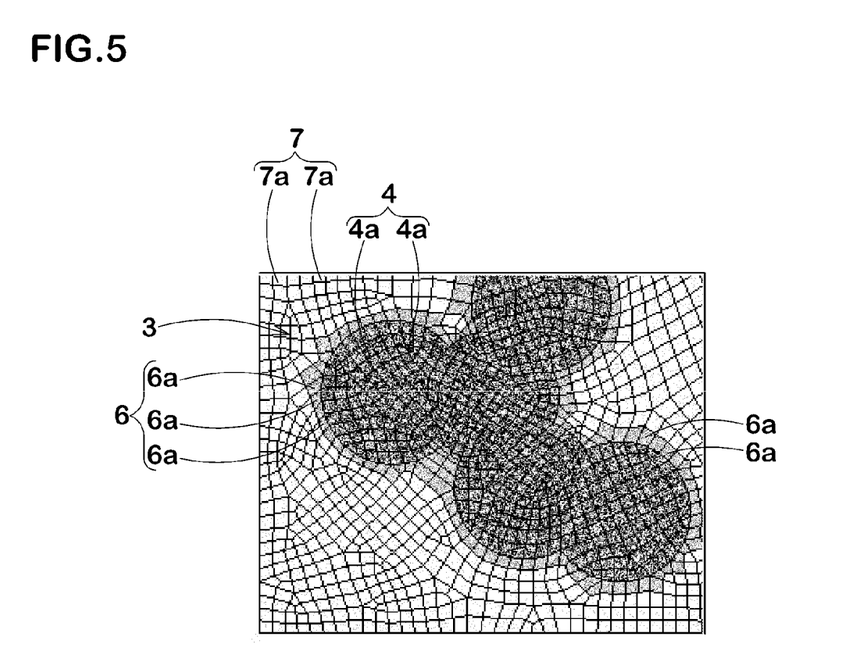
FIG. 5 is a partial enlarged view illustrating a step of setting, as a matrix model, elements outside the interface model.
Figure 6:
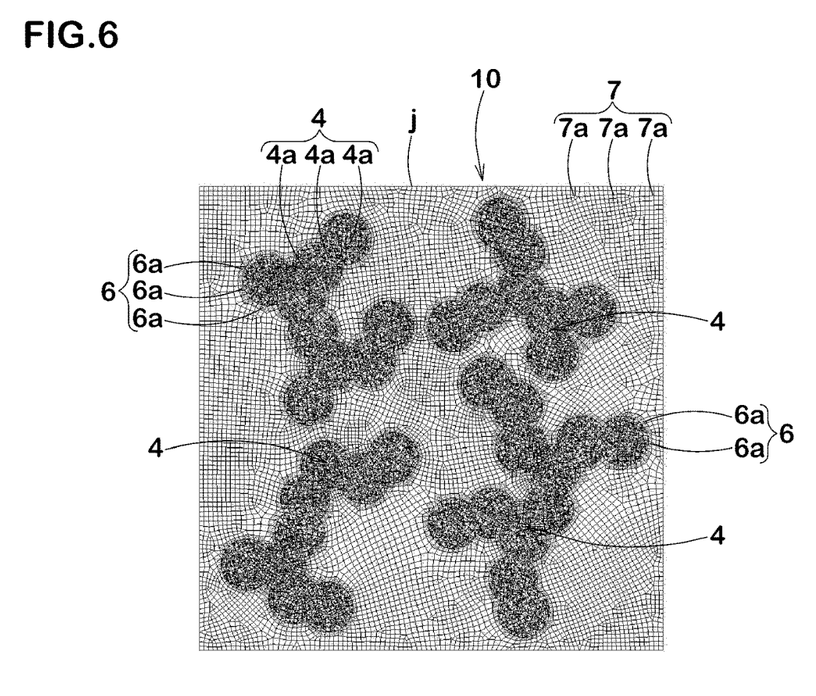
FIG. 6 is a diagram illustrating a simulation model according to the embodiment of the present invention.

Next, as shown in FIG. 5, in this embodiment, processing is performed to set, as a matrix model 7, elements 7a outside the interface model 6 among the elements of the non-filler region 3 (step S5). This processing results in production of the simulation model 10, as shown in FIG. 6, in which the two-dimensional space "j" is partitioned into the filler models 4, the matrix model 7, and the interface models 6 between the filler models 4 and the matrix model 7.

Note that, for each of the elements 4a of the filler model 4, each of the elements 6a of the interface model 6, and each of the elements 7a of the matrix model 7, values of physical properties such as density and modulus of elasticity are defined as computing parameters, and stored in the computer device. In particular, for each of the elements 6a constituting the interface model 6, physical properties different from physical properties of the matrix model 7, for example, a larger hardness and a larger tan b than the matrix model 7, are preferably defined. Thus, various deformation states that may occur in an actual rubber material, for example, causing a larger energy loss or difficulty in deformation in the interface model 6, can be reproduced in the simulation with high precision.

The simulation model 10 produced through the above-described processing has an outline shape and a dispersed state closely resembling an outline shape and a dispersed state of actual carbon. Consequently, calculation results in the simulation approximate calculation results of the actual material, so that a significant improvement in simulation precision can be expected. Also, even if the filler has a complicated outline shape including, for example, re-entrant parts, the producing processing of the simulation model 10 can be performed by continuous automatic processing with the computer. This reduces the number of human operations and the producing processing can be performed in a short time.

Further, in this embodiment, the two-dimensional simulation model 10 has been described. Another possible example is to repeatedly perform the above-described processing in the direction of thickness of the carbon reinforced rubber and to produce a three-dimensional simulation model between the repetitions.

Figure 7:
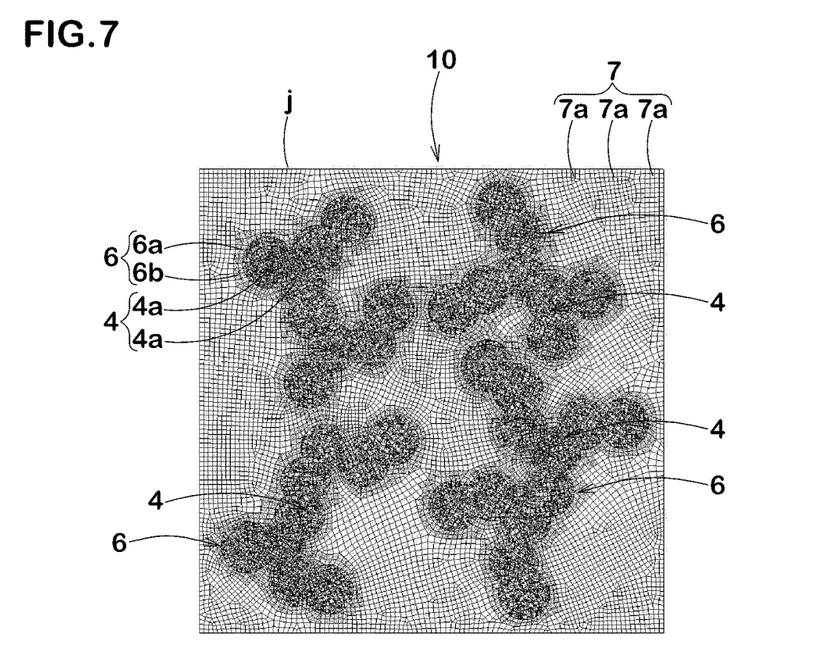
FIG. 7 is a diagram illustrating a simulation model according to another embodiment.

Moreover, in the case of carbon compound rubber, the thickness of the interface model 6 is generally considered to be approximately one to ten nanometers. In order to adjust the thickness to such a value, the thickness of the interface model 6 can be set as desired in accordance with the size of the elements a. For example, in the step S4 of setting the interface model 6, the elements 6a in contact with the filler model 4, and elements 6b in contact with an outside of the elements 6a can be further set as the interface model 6. Then, the number of the elements in contact with the outside of the elements 6a can be determined to change the thickness. Thus, as shown in FIG. 7, the thickness of the interface model 6 can be set to be large and as desired in accordance with the size of the elements.

The embodiments of the present invention have been described above. However, other than the carbon reinforced rubber, the present invention can be likewise applied to production of a simulation model of, for example, rubber compositions and various types of elastomers including silica as a filler.

DESCRIPTION OF THE REFERENCE NUMERAL j Two-dimensional space of simulation model
E, Ea to Ed Boundary
2, 2a to 2d Filler region
3 Non-filler region
4 Filler model
4a to 4d Element constituting filler model
6 Interface model
6a to 6d Element constituting interface model
7 Matrix model
7a to 7d Element constituting matrix model
10 Simulation model

The invention claimed is:

1. A method for producing, using a computer, a simulation model of a filler compound in which a filler is dispersed and mixed in a matrix, the method comprising:
   obtaining a microscopic image of an actual filler compound containing the matrix and the filler using a transmission electron microscope (TEM);
   defining a simulation-model forming space so as to include the matrix and the filler based on the microscopic image;
   processing the simulation-model forming space to extract an edge of the filler;
   partitioning, using the computer, the simulation-model forming space into a filler region and a non-filler region so as to determine a boundary between these regions based on the edge of the filler;
   dividing the filler region into a finite number of elements so as to set a filler model;
   dividing the non-filler region into a finite number of elements;
   setting, as an interface model, a finite number of first elements which are in contact with the filler model among the finite number of elements of the non-filler region, wherein the step of setting the interface model further comprises adding, as the interface model, a finite number of second elements in contact with an outside of the first elements in contact with the filler model;
   adjusting a thickness of the interface model according to sizes of the finite number of elements of the filler region;
   after setting the interface model, setting, as a matrix model, at least one element among the finite number of elements of the non-filler region, the at least one element being outside the interface model; and
   producing the simulation model of the filler compound according to the filler model, the interface model and the matrix model, the interface model being between the filler model and the matrix model, wherein the step of producing the simulation model includes continuous automatic processes performed by the computer to obtain a more accurate outline shape and dispersed state resembling an actual outline shape and dispersed state of an actual material of the filler compound, thereby reducing manual intervention for adjustment of the outline shape and dispersed state.

2. The method for producing the simulation model of the filler compound according to claim 1,
   wherein a physical property defined for the interface model is different from a physical property of the matrix model.

3. A method for producing, using a computer, a simulation model of a filler compound in which a filler is dispersed and mixed in a matrix, the method comprising the steps, in the sequence set forth, of:

obtaining a microscopic image of an actual filler compound containing the matrix and the filler using a transmission electron microscope (TEM);

defining a simulation-model forming space so as to include the matrix and the filler based on the microscopic image;

processing the simulation-model forming space to extract an edge of the filler;

partitioning a simulation-model forming space, using a computer, into a filler region and a non-filler region so as to determine a boundary between these regions;

dividing the filler region into a finite number of elements so as to set a filler model;

dividing the non-filler region into a finite number of elements;

setting, as an interface model, a finite number of first elements which are in contact with the filler model among the finite number of elements of the non-filler region, wherein the step of setting the interface model further comprises adding, as the interface model, a finite number of second elements in contact with an outside of the first elements in contact with the filler model;

adjusting a thickness of the interface model according to sizes of the finite number of elements of the filler region;

setting, as a matrix model, at least one element among the finite number of elements of the non-filler region, wherein the at least one element being outside the interface model; and producing the simulation model of the filler compound according to the filler model, the interface model and the matrix model, the interface model being between the filler model and the matrix model, wherein the step of producing the simulation model includes continuous automatic processes performed by the computer to obtain a more accurate outline shape and dispersed state resembling an actual outline shape and dispersed state of an actual material of the filler compound, thereby reducing manual intervention for adjustment of the outline shape and dispersed state.

4. The method for producing the simulation model of the filler compound according to claim 3, wherein a physical property defined for the interface model is different from a physical property of the matrix model.

* * * * *